Jan. 26, 1932. E. P. MACK 1,842,618
ANIMAL TRAP
Filed May 10, 1928 2 Sheets-Sheet 2

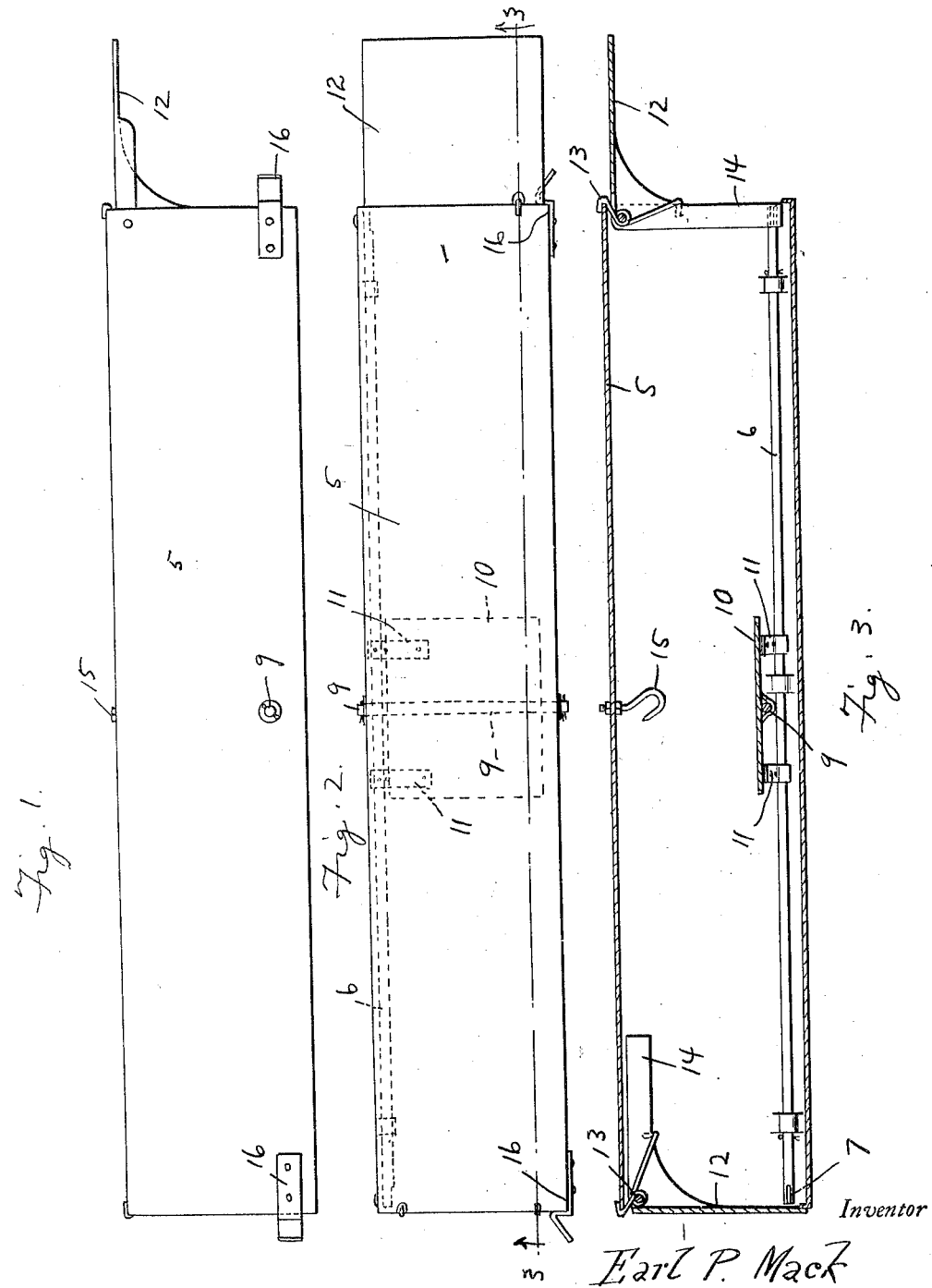

Inventor
Earl P. Mack

By Clarence A. O'Brien
Attorney

Patented Jan. 26, 1932

1,842,618

UNITED STATES PATENT OFFICE

EARL P. MACK, OF MORSE, WISCONSIN

ANIMAL TRAP

Application filed May 10, 1928. Serial No. 276,623.

This invention relates to new and useful improvements in animal traps and aims to provide a simple but effective trap consisting generally of a container open at its opposite ends and provided with spring controlled normally closed doors at the opposite ends, means being provided for normally maintaining these doors in open position, but further means being provided within the interior of the container and actuated by the weight of the animal to automatically release the doors so that they will close, thus trapping the animal therein.

By reason of a trap of this character, an animal can have a clear view throughout the entire length of the trap so that he will not be afraid to pass therein in order to reach the bait disposed within the container, it being well known that few, if any animals will pass into a container or trap of any kind unless a clear vision can be had entirely therethrough.

In the drawings wherein like reference characters indicate corresponding parts throughout the several views:

Figure 1 is a side elevation of the trap, one of the end doors being arranged in open position, and the opposite end door closed.

Figure 2 is a top plan view thereof.

Figure 3 is a detail longitudinal section.

Figure 4:
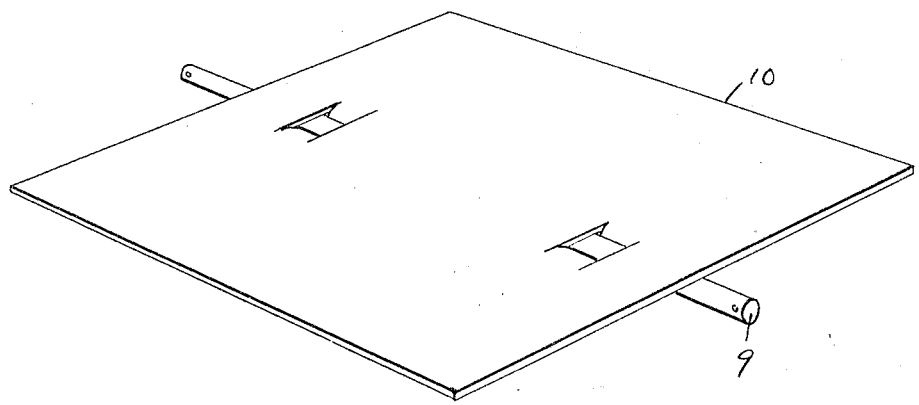
Figure 4 is a top side perspective of the animal control release plate or treadle.
Figures 5, 6:
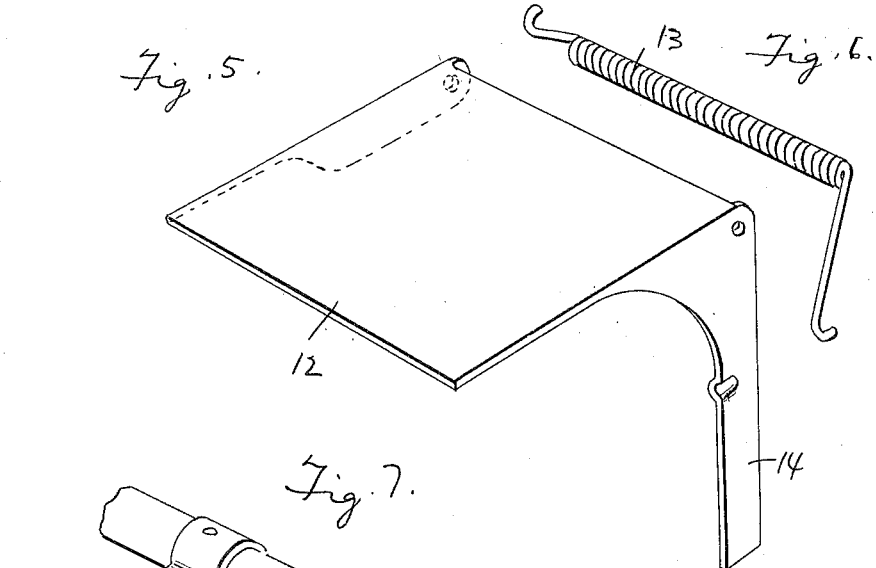
Figure 5 is a top side perspective of one of the spring controlled doors.
Figure 6 is a perspective of one of the door associated springs.
Figure 7:
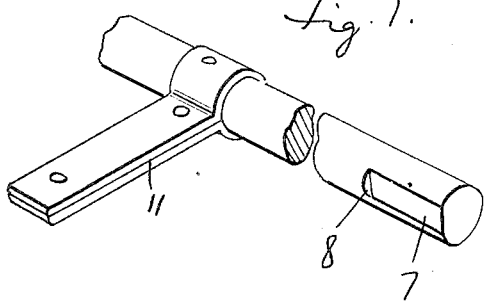
Figure 7 is a fragmentary perspective of one end of the treadle attached latch rods constructed at its opposite ends to maintain the doors in open position, but to automatically release the doors when the rod is turned.

Now having particular reference to the drawings, my novel trap consists of an elongated housing or container 5 of sheet metal or other suitable material, preferably of square shape in cross section, and open at its opposite ends. Suitably journaled within the container 5 in spaced relation with the bottom wall thereof and at one side of the container is a longitudinally extending rod 6. The outer surface of said rod is formed at its opposite ends with elongated plane portions 7—7 to provide in each instance a shoulder 8 adjacent each end thereof. Pivotally arranged transversely within the container 5 directly above the rod 6 is a rock shaft 9 to the top side of which is secured a trip plate or treadle 10. Bent around the rod 6 beneath and at one end of the plate or treadle 10 and secured thereto is a pair of metallic straps 11—11, the inner ends thereof extending beneath the trip plate or treadle 10 at opposite sides of its supporting shaft 9 so that when the plate or treadle is swung downwardly at either side of the shaft 9, the said rock shaft 6 will be turned about its axis.

Pivotally connected by pins as shown within the opposite open ends of the container or housing 5 directly beneath the top wall thereof are doors 12—12 normally forced into closed position by suitable coil springs 13—13. At one longitudinal edge of each door 12 there is formed a right angular leg 14, which when the door 12 is in raised position will be in perpendicular position within the open end of the container. As disclosed more clearly in Figure 3, the legs of these doors are at the edges adjacent the ends of the rock shaft 6. Obviously therefore when the doors are raised and the rock shaft 6 turned so as to bring the plane surfaces 7 thereof into engagement with the lower ends of the legs, said legs will abut against the shoulders 8 at the inner ends of the plane surfaces 7 to lock the doors in raised position. Directly above the trip plate or treadle 10 is a bait hook 15, and it will of course be apparent that when the plate or treadle is tilted in either direction the shaft 6 will be turned for moving the shoulders 8 out of engagement with the door legs, whereupon the doors will immediately close under the action of the springs 13—13, said springs being engaged with the housing 5 and the door legs 14 as clearly brought out in Figure 3. In order to maintain the doors closed against the action of the animals therein, suitable spring latches 16—16 are provided upon one of the side walls of the container at opposite open ends thereof.

Having thus described the invention, what I claim as new and desire to secure by Letters Patent is:—

An animal trap comprising a housing with an open end, a door connected by a pivot pin to said end of the housing, and having an arm swingably movable within the housing, a spring coiled about said pivot pin and having arms in engagement with the housing and the door arm, respectively, a longitudinal rock shaft mounted in said housing and having an end portion of circular cross section and also having a plane surface in the perimeter of said end portion and a shoulder at the inner end of the plane surface, a vertically movable platform within the housing, and means fixed to and extending laterally from said rock shaft and disposed under said platform.

In testimony whereof I affix my signature.

EARL P. MACK.